(12) United States Patent
Resh (10) Patent No.: US 6,201,666 B1
(45) Date of Patent: Mar. 13, 2001

(54) DISC DRIVE HEAD SUSPENSION WITH SINGLE-POINT CONTACT FEATURE FOR RAMP LOAD/UNLOAD

(75) Inventor: Roger Alan Resh, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/215,428

(22) Filed: Dec. 18, 1998

Related U.S. Application Data (63) Continuation-in-part of application No. 09/168,179, filed on Oct. 7, 1998, now abandoned.
(60) Provisional application No. 60/061,393, filed on Oct. 7, 1997.

(51) Int. Cl.[7] ........................................................ G11B 5/54
(52) U.S. Cl. ........................................................ 360/255.9
(58) Field of Search ................................ 360/105, 254.6, 360/255, 255.5, 255.9

(56) References Cited

U.S. PATENT DOCUMENTS

| | | | |
|---|---|---|---|
| 5,027,241 | * | 6/1991 | Hatch et al. . |
| 5,237,472 | * | 8/1993 | Morehouse et al. . |
| 5,289,325 | * | 2/1994 | Morehouse et al. . |
| 5,585,980 | * | 12/1996 | Boutaghou . |
| 5,623,758 | * | 4/1997 | Brooks, Jr. et al. . |
| 5,625,514 | * | 4/1997 | Kubo et al. . |
| 5,742,454 | * | 4/1998 | Vera et al. . |
| 5,864,448 | * | 1/1999 | Berberich . |
| 5,966,270 | * | 10/1999 | Coon . |
| 5,973,887 | * | 10/1999 | Cameron . |
| 6,014,290 | * | 1/2000 | Supramaniam et al. . |

FOREIGN PATENT DOCUMENTS 8-102156 * 4/1996 (JP) .

* cited by examiner

Primary Examiner—Craig A. Renner
(74) Attorney, Agent, or Firm—Edward P. Heller, III (57) ABSTRACT

A head suspension for mounting and supporting the head assembly in a disc drive. The head suspension includes a ramp contact feature located adjacent the leading edge of the head assembly, and the ramp contact feature is in the form of an inclined cylinder with a spherical contact end. The shape of the ramp contact feature allows for simplification of the ramp surface profile and provides the ability to allow for assembly tolerance build-up in multi-disc disc drive assemblies.

6 Claims, 6 Drawing Sheets

DISC DRIVE HEAD SUSPENSION WITH SINGLE-POINT CONTACT FEATURE FOR RAMP LOAD/UNLOAD

CROSS-REFERENCE TO RELATED APPLICATION

This application is a continuation-in-part of U.S. patent application Ser. No. 09/168,179 filed on Oct. 7, 1998, now abandoned, which claims priority to U.S. Provisional Application Ser. No. 60/061,393 filed on Oct. 7, 1997.

FIELD OF THE INVENTION

This invention relates generally to the field of rigid disc drives, and more particularly, but not by way of limitation, to a head suspension for a disc drive that includes a novel contact feature that facilitates the ramp loading and unloading of the heads away from and into operative relationship with the discs in the disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater without becoming inoperable. Moreover, future disc drive products are being developed which must be capable of withstanding non-operating shocks of up to 1000 G without suffering fatal damage.

One of the undesirable possible consequences of mechanical shocks applied to a disc drive is the phenomenon commonly referred to in the industry as "head slap". This condition occurs when the applied mechanical shock is large enough to overcome the load force applied to the head assembly by the head suspension. Under such conditions, the head assembly lifts away from the disc surface, and when the shock event terminates, the head assembly moves back into contact with the disc in an uncontrolled manner, potentially causing damage to the head assembly, disc or both.

One common preventive measure used in the industry to prevent head slap is to use ramps closely adjacent the outer diameter of the discs to unload the heads from engagement with the discs when a non-operating condition, such as loss of disc drive power, is detected. Since the heads are no longer resting on the disc surface, applied mechanical shocks cannot cause uncontrolled contact between the heads and discs. Once proper operational conditions are restored, the head assemblies are reloaded into engagement with the discs for normal disc drive operation.

In order to ramp load/unload the head assemblies, the head suspensions which support the head assemblies must include some sort of ramp contact feature to cooperate with the ramps, and these ramp contact features can be divided into two general groups: 1) ramp contact features located adjacent the leading edge of the head assembly, i.e., between the actuator pivot point and the head assembly; and 2) ramp contact features located adjacent the trailing edge of the head assembly, i.e., at the far distal end of the head suspension.

Head suspensions that include ramp contact features from the first group have the advantages of low mass and inertia during actuator seeks, high modal frequencies, good operating shock characteristics and simple access to the bonding pads used for electrical connection of the head transducers. The prior art use of this type of ramp contact feature does, however, have the disadvantages of requiring a parabolic ramp surface to ensure point contact between the ramp surfaces and the ramp contact features and insufficient clearance between the ramp contact feature and the disc surface to allow for assembly tolerances in a multi-disc disc drive assembly.

Head suspension assemblies that include ramp contact features from the second group have the advantages of allowing for flexibility of design of the contact features to allow for sufficient spacing between the disc surface and the ramp contact features, and the capability of having the ramp contact feature located on the head suspension centerline to limit static attitude biases on the gimbal of the head suspension. However, such assemblies typically introduce unwanted mass and inertia during seek operations, have less desirable modal frequencies, less desirable operating shock characteristics and greatly restricted access to the head assembly electrical bonding pads.

All of the advantages of head suspensions from the first group noted above are achieved by the present invention, without suffering several of the noted disadvantages of the second group.

SUMMARY OF THE INVENTION

The present invention is a head suspension for mounting and supporting the head assembly in a disc drive. The head suspension includes a ramp contact feature located adjacent the leading edge of the head assembly, and the ramp contact feature is in the form of an inclined cylinder with a spherical contact end. The shape of the ramp contact feature allows for simplification of the ramp surface profile and provides the ability to allow for assembly tolerance build-up in multi-disc disc drive assemblies.

It is an object of the present invention to provide a head suspension assembly for a disc drive.

It is another object of the invention to provide a head suspension assembly that includes a ramp contact feature for facilitating ramp loading and unloading of the head assembly.

It is another object of the invention to provide a head suspension that has improved ramp contact characteristics.

These and other features and advantages of the present invention can best be understood from the following Detailed Description of the Invention, when read in conjunction with an examination of the accompanying drawings.

DETAILED DESCRIPTION OF THE INVENTION

Figure 1:
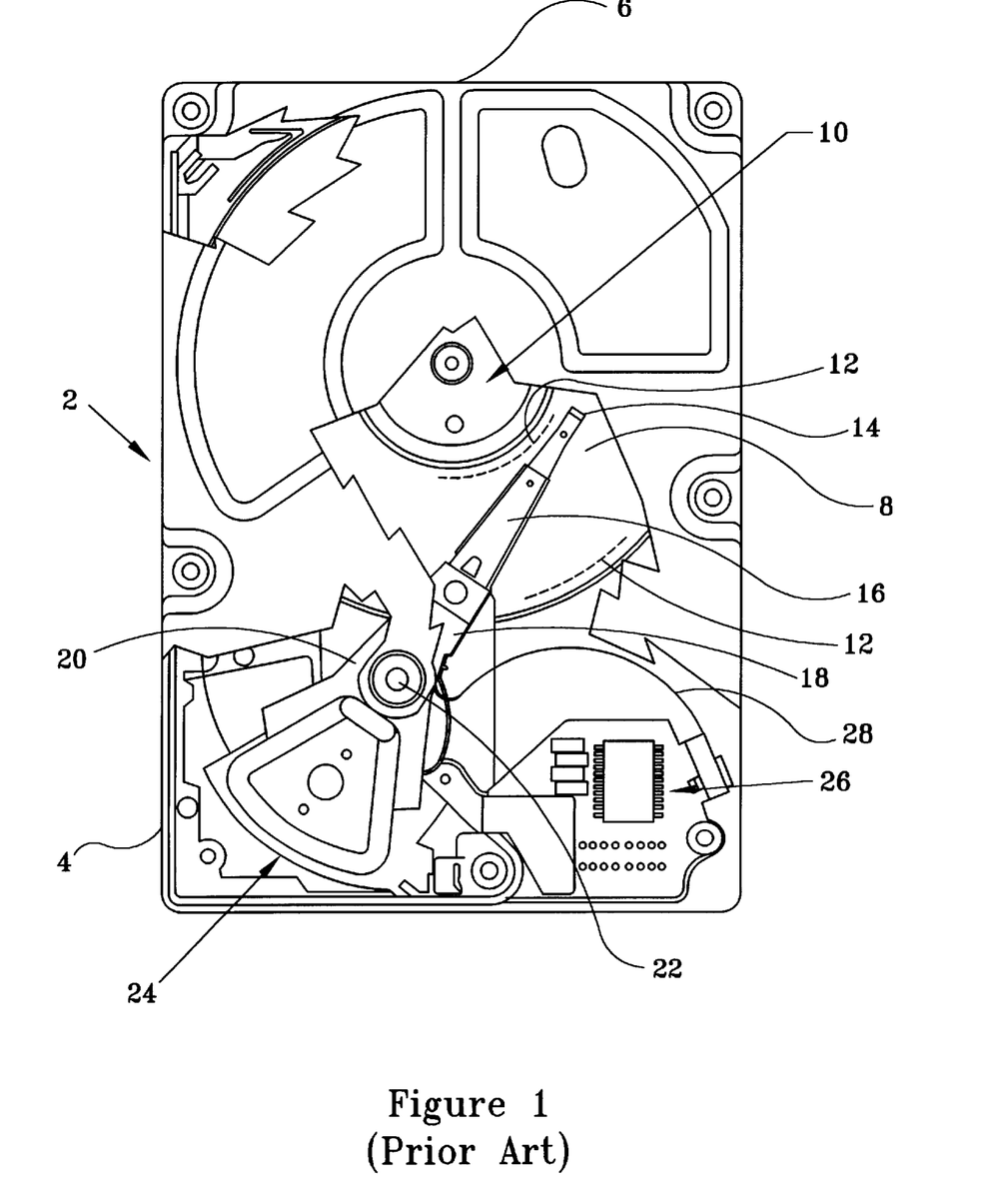
FIG. 1 is a plan view of a disc drive in which the present invention is particularly useful.

Turning now to the drawings and specifically to FIG. 1, shown is a plan view of a prior art disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes one or more discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

The prior art disc drive 2 of FIG. 1 is of the type referred to in the industry as a "contact start-stop" drive. That is, when power to the disc drive 2 is removed, the head assemblies 14 are moved to a park position near the inner diameter of the discs 8, as shown in the figure, and the actuator assembly is latched at this park position. As the discs 8 cease to spin, the head assemblies 14 come to rest in contact with the surfaces of the discs 8, and remain in contact with the discs 8 until such time as power is restored to the disc drive 2. As part of the start-up sequence which the disc drive executes upon restoration of power, the spindle motor 10 is accelerated to its operational speed while the actuator remains latched at the park position. Once the spindle motor 10 reaches sufficient speed to fly the head assemblies 14, the actuator is unlatched, and the remainder of the start-up initialization is executed.

The recently implemented small head assemblies 14 require that the head suspensions 16 exert only a small amount of load force to the head assemblies 14 in order to maintain the head assemblies 14 in their desired operational relationship to the discs 8. This small load force is advantageous during the contact start-stop operations described immediately above, since the small load force minimizes the possibility of frictionally-induced damage to the head assemblies 14 and discs 8 during the short time interval when the discs 8 are spinning at speeds too slow to fly the head assemblies 14.

However, as noted above, disc drives of the current generation are commonly specified to be able to withstand the application of mechanical shocks on the order of 1000 G during non-operational conditions. With this requirement, the small amount of load force applied to the head assemblies 14 is a detriment, since it lowers the amount of mechanical shock that can be applied to the disc drive without lifting the head assemblies 14 away from the surfaces of the discs 8, resulting in head slap and potential damage to the head assemblies 14, the discs 8 or both.

One typical approach to prevention of head slap in disc drives involves the use of ramp structures located closely adjacent the outer diameter of the discs. The implementation of ramp structures involves the inclusion of head suspension assemblies having specially formed contact features. When a non-operation condition, such as a power loss or "sleep" condition is sensed by the disc drive, the actuator moves the head assemblies toward the outer diameters of the discs. As the heads pass outward of the outermost operational data storage area on the discs, the contact features of the head suspensions contact the surfaces of the ramp structure, and, as the actuator continues to move the heads outward, the head assemblies are lifted away from their normal cooperative relationship with the discs. The heads are typically moved outward until they are no longer axially over the discs and are positioned at a predefined park position. The actuator is then latched at this park position until such time as the non-operational condition terminates.

Upon termination of the non-operational condition, the spindle motor accelerates the discs until they reach the operational speed. The actuator is then unlatched, and moves the head assemblies inward toward the discs. As this inward motion occurs, the contact features of the head suspensions travel back down the ramp structures until such time as the heads are reestablished in their operational relationship to the discs, and normal operation of the disc drive is resumed.

Figure 2:
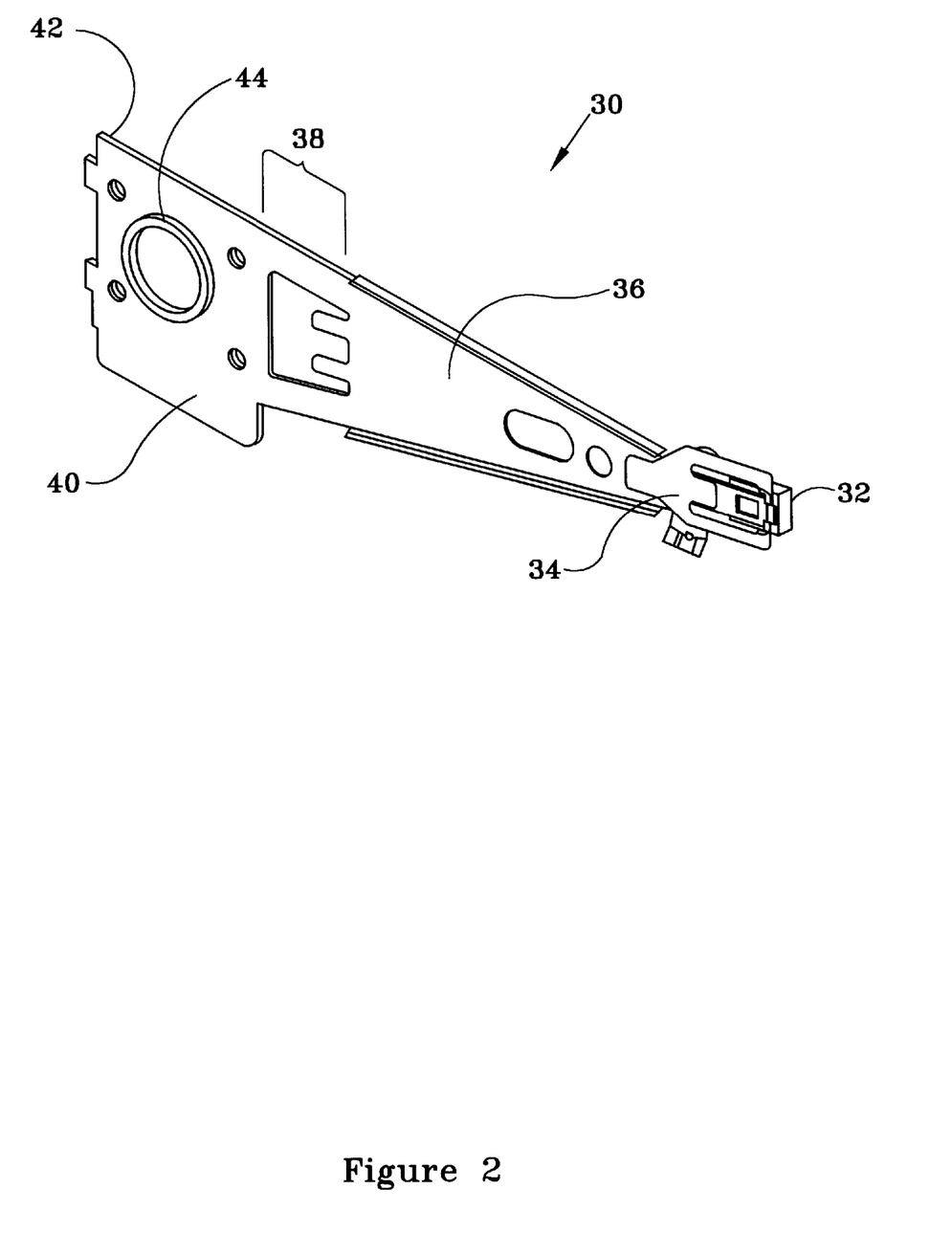
FIG. 2 is a perspective view showing the major components of a head/head suspension assembly.

FIG. 2 is a perspective view of a head/head suspension assembly 30, showing the major components. The head/head suspension assembly 30 includes a head assembly 32, which carries the read/write transducers used to record and retrieve data on the discs.

The head assembly 32 is typically adhesively attached to a gimbal 34, which is compliant in the roll and pitch axes of the head assembly 32, and stiff in the yaw and in-plane axes. This compliance allows the head assembly 32 to follow minor surface variations in the disc surface, while the stiff yaw and in-plane characteristics allow for rapid and accurate positioning of the transducers to the data tracks on the discs. The gimbal is typically formed of stainless steel foil on the order of 1 milli-inches (0.001 inches) thick.

The gimbal 34 is typically spot welded to a load beam 36 which is formed from relatively robust stainless steel foil with a thickness on the order of 2 milli-inches (0.002 inches). The lateral edges of the load beam are commonly formed into channels to provide additional stiffness and to provide a path for the conductors (not shown) which carry electrical signals to and from the transducers on the head assembly 32.

The load beam 36 is typically connected by a spring portion 38 to a mounting portion 40. The mounting portion 40, spring portion 38 and load beam 36 are all formed from the same sheet of stainless steel foil, which, while stronger than the material of the gimbal 34, is still relatively fragile. In order to provide a strong connection of the entire head/head suspension assembly 30 to the actuator head mounting arms (18 in FIG. 1), the mounting portion 40 is typically spot welded to a thick mounting plate 42, which also includes features for facilitating the attachment of the head/head/suspension assembly 30 to the actuator. In the example shown in FIG. 2, the mounting plate 42 includes a swage boss 44 which is mechanically expanded in a cooperative hole in the actuator head mounting arm at assembly.

Since, as previously noted, the head assembly 30 acts in a cooperative hydrodynamic relationship with air dragged along by the spinning disc, the head assembly 30 generates a lifting force which tends to separate the head assembly from the disc. This hydrodynamic lifting force is countered by the spring force generated by the forming of the spring portion 38. The countering spring force is passed from the spring portion 38 through the stiff load beam 36 to the head assembly 30 in a manner well known in the industry, and which will be discussed in more detail hereinbelow.

Figure 3:
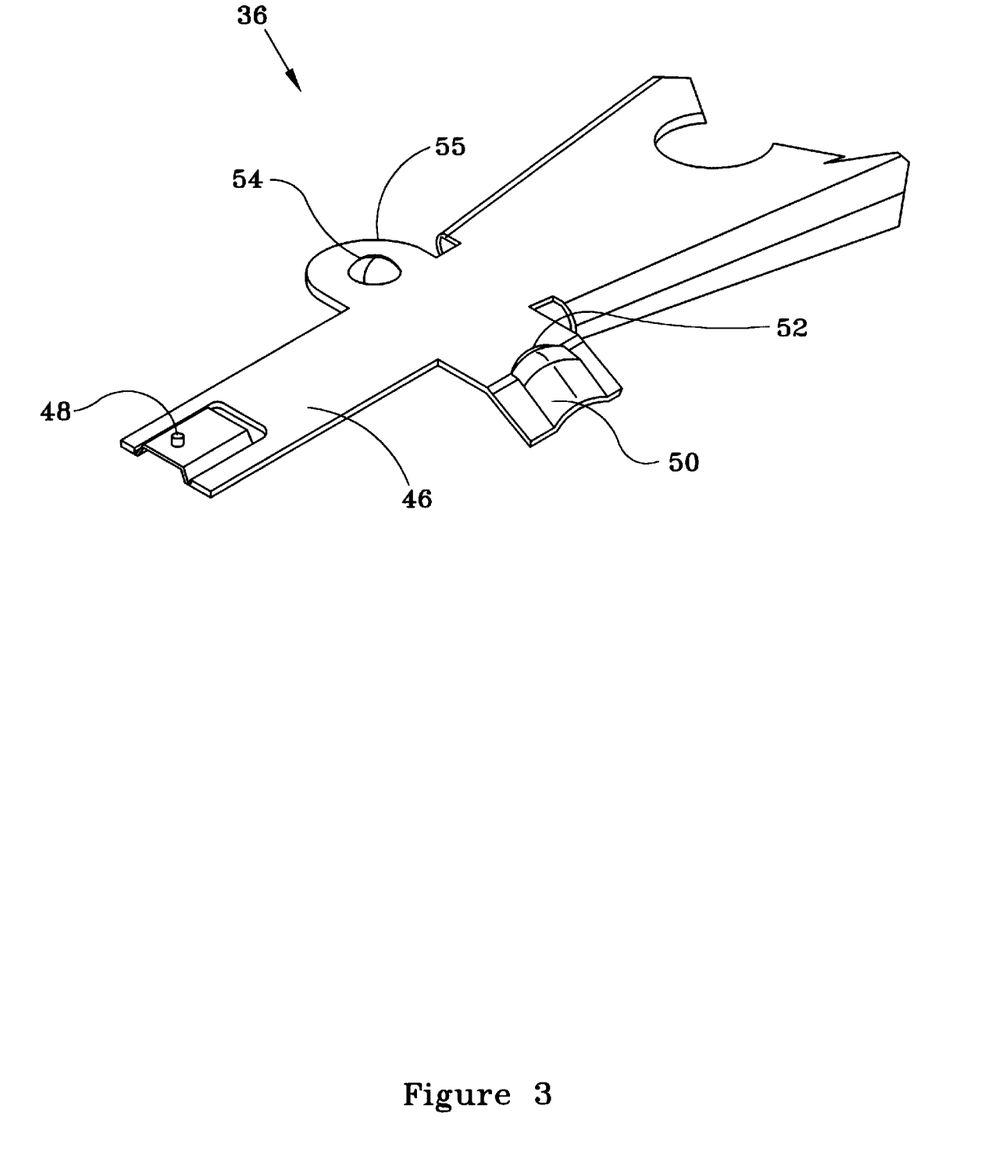
FIG. 3 is a detail perspective view of a load beam component that forms a portion of the present invention.

FIG. 3 is a detail partial perspective view of the bottom of the load beam 36 of FIG. 2. In the ensuing discussion, the terms "up", "upper", "top" and related terms will refer to the direction and component elements away from the disc surface, while the terms "down", "lower", "bottom" and related terms will refer to the direction and component elements toward, or facing, the discs.

FIG. 3 shows that the load beam includes a load point tab 46 at its distal end. The load point tab can be seen to include a specially formed load point button 48. The manner in which the load point button and associated features are fabricated using the processes of half-etching and stamp forming can be found in U.S. Pat. No. 5,638,234, issued Jun. 10, 1997, assigned to the assignee of the present invention and incorporated herein by reference. While a particular example of a load point button is shown for illustration, other types of contact points may well be included in the head suspension, including conventional stamped dimples. Therefore, the scope of the present invention is not envisioned as being limited by the particular type of contact point utilized.

The function of the load point button is to provide point-contact for the transfer of the load force generated by the spring portion (38 in FIG. 2) as will be explained in detail hereinbelow.

In FIG. 3, it can also be seen that the load beam 36 includes a ramp contact feature 50, which is a principal element of the present invention. The figure shows that the ramp contract feature 50 is in the form of an inclined semi-cylinder with a spherical end portion 52 formed on a tab (not designated) extending laterally from the load beam 36 near the base of the load point tab 46. One of skill in the art will realize that the direction in which the tab extends from the load beam 36 will be dependent upon whether the head suspension is intended for use with a head assembly on the lower or upper surface of the disc. The manner in which the ramp contact feature interacts with a ramp structure will be discussed below.

FIG. 3 also shows an optional secondary contact feature 54 located on a second tab 55 extending laterally from the opposite side of the load beam 36. Again, the function of the secondary contact feature will be discussed below.

Figure 4:
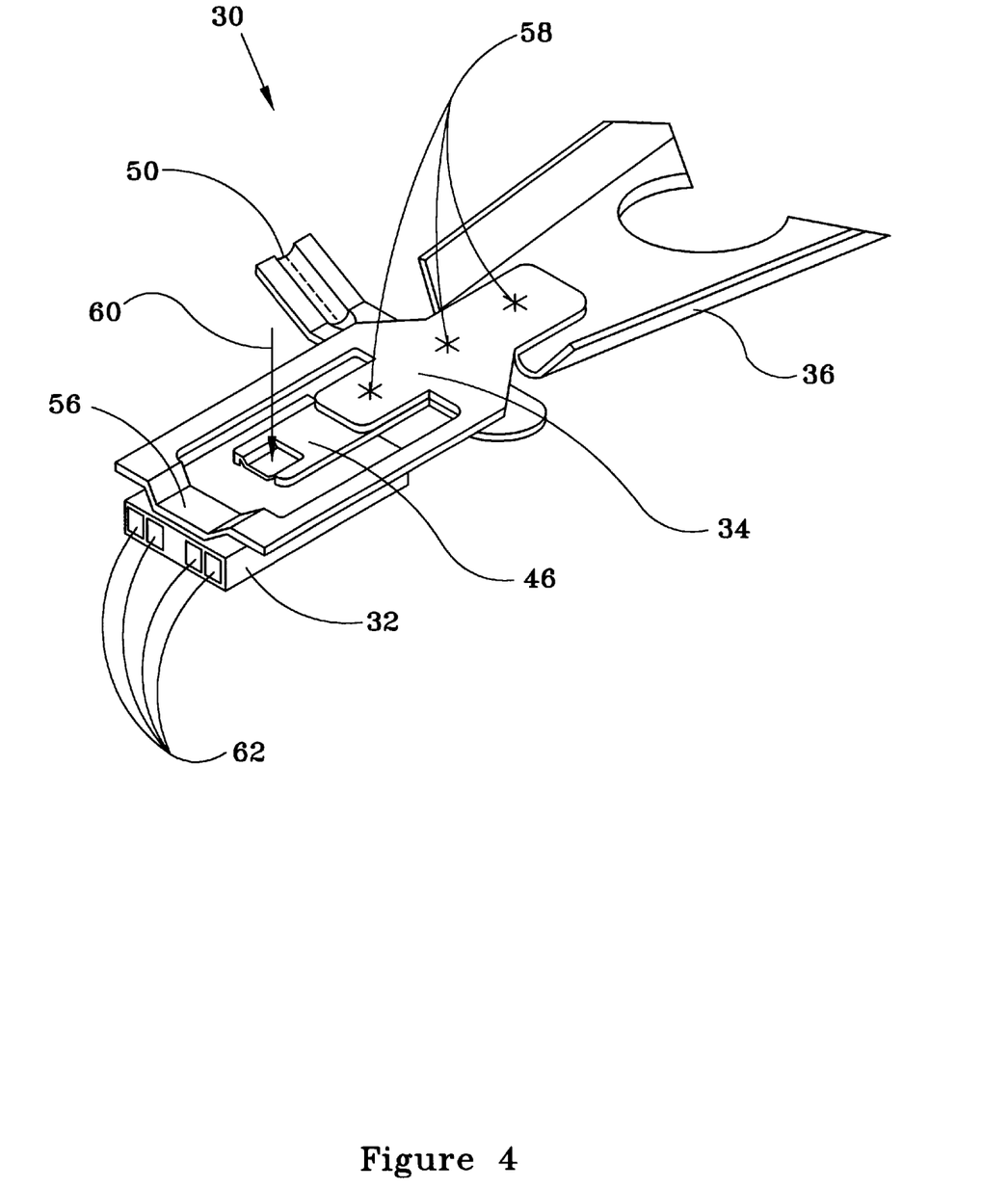
FIG. 4 is a detail perspective view of a head/head suspension assembly incorporating the head suspension of the present invention.

Turning now to FIG. 4, shown is a detail partial perspective view of a head/head suspension assembly 30, such as that of FIG. 2, which includes the inventive ramp contact feature 50 described above in regard to FIG. 3. The figure also shows a head assembly 32, a gimbal 34 and a load beam 36, as described above with regard to FIG. 2.

FIG. 4 shows that the head assembly 32 is adhesively attached to the gimbal 34 at a head mounting portion 56, and the gimbal is spot welded to the load beam 36 at, for example, points designated 58. As can be seen, the head mounting portion 56 is formed out-of-plane from the remainder of the gimbal 34. This forming brings the top surface of the head assembly 32 into horizontal alignment with the bottom of the load point button (48 in FIG. 3) on the load point tab 46. The load force generated by the spring portion (38 in FIG. 2) of the head suspension 30 is applied to the head assembly 32 near its center, as indicated by arrow 60, at a location specifically selected to fly the head assembly 32 at the desired attitude relative to the disc.

FIG. 4 also shows the electrical terminations 62, or bonding pads, used to attach the fine wires used to carry electrical signals to and from the transducers (not shown) on the head assembly 32. As is evident from the drawing, the present configuration, which places the ramp contact feature 50 between the head assembly 32 and the mounting end of the head suspension 30, facilitates access to both the electrical terminations 62 for ease of electrical assembly, and to the gimbal 34 for any needed mechanical adjustment of the static attitude of the head assembly 32. As previously mentioned above, head suspensions which incorporate ramp contact features located at the far distal end of the head suspension obstruct access to both the electrical terminations and to the gimbal, increasing the difficulty of electrical assembly and adjustment of static head assembly attitude.

Figure 5:
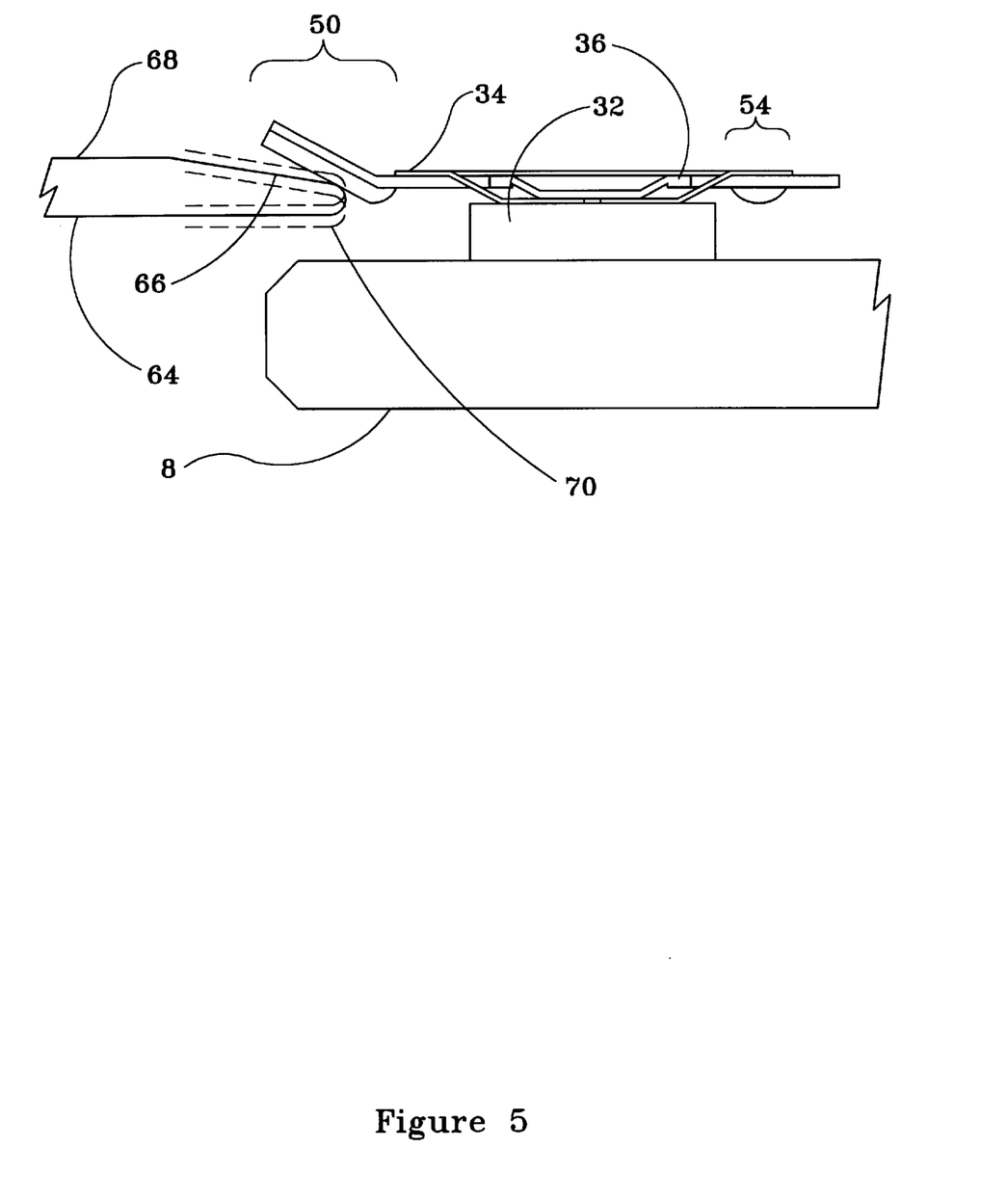
FIG. 5 is a detail end elevation view showing the inventive head suspension and associated head assembly, disc and ramp structure.

Turning now to FIG. 5, shown is a detail end elevation view of a head/head suspension assembly incorporating the present invention in operational relationship to a disc 8 and a ramp structure 64. The ramp structure 64 can be seen to include both a beveled ramp portion 66 and a flat park portion 68. It is well known in the industry that the relative position of the ramp structure 64 to the surface of the disc 8 can be adversely affected by dimensional tolerance buildup in the components of the disc stack. For purposes of illustration, the nominal position of the ramp structure 64 relative to the disc 8 is shown in solid lines, while extremes of position due to dimensional tolerance buildup are represented by dashed lines at 70.

In FIG. 5, the gimbal 34 can be seen attached to the top surface of the head assembly 32. Only relevant portions of the load beam 36 are shown for the sake of clarity.

When the disc drive enters a non-operational condition, the actuator begins moving the head assembly 32 toward the outer diameter of the disc 8, i.e., to the left in the figure. As the head moves outward, the ramp contact feature 50 eventually comes into contact with the ramp structure 64. If the ramp structure is at its nominal position, the cylindrical portion of the ramp contact feature 50 is the first part of the ramp contact feature 50 to contact the ramp structure 64, and the cylindrical configuration results in point contact between the load beam 36 and the ramp structure 64. As the cylindrical portion of the ramp contact feature 50 continues to slide up the ramp structure 64, point contact is maintained until the spherical end portion of the ramp contact feature 50 meets the beveled ramp portion 66 of the ramp structure 64. The novel configuration of the ramp contact feature 50 ensures that such point contact is also maintained even after the ramp contact feature 50 reaches the top of the ramp portion 66 and begins moving along the flat park portion 68.

One of skill in the art will realize from an analysis of FIG. 5 that the desirable point contact is achieved by the ramp contact feature 50 of the present invention even when the ramp structure 64 is displaced from its nominal relationship to the disc 8 due to dimensional tolerance buildup. That is, the inclined cylinder portion of the ramp contact feature 50 has a length and inclination angle which causes the cylindrical portion of the ramp contact feature 50 to contact the ramp structure 64 even when the ramp structure 64 is at the maximum upper extreme of mislocation. In the worst case where the ramp structure 64 is at its lowest possible position due to dimensional tolerance buildup, either the lowermost end of the cylindrical portion or the spherical portion will contact the ramp structure 64, ensuring the desired functionality even in the presence of extremes of dimensional tolerance buildup.

FIG. 5 also shows the optional secondary contact feature 54. As the ramp contact feature 50 contacts and begins moving up the ramp structure 64, the asymmetrical location of the ramp contact feature 50 relative to the load structure of the head suspension causes a torque or roll moment to be imparted to the head suspension. If the relevant portions of the head suspension are not strong enough to tolerate this torque force, the head assembly can assume an unwanted attitude. There is also the possibility of an etched edge of the head suspension coming into contact with the ramp structure 64, with the potential of damaging particle generation. Therefore, the secondary contact feature 54, located on the opposite side of the head suspension from the ramp contact feature 50, is provided to remove the torque moment from the head suspension as the heads are moved into alignment with the flat park portion 68 of the ramp structure 64 and into the park position.

Figure 6:
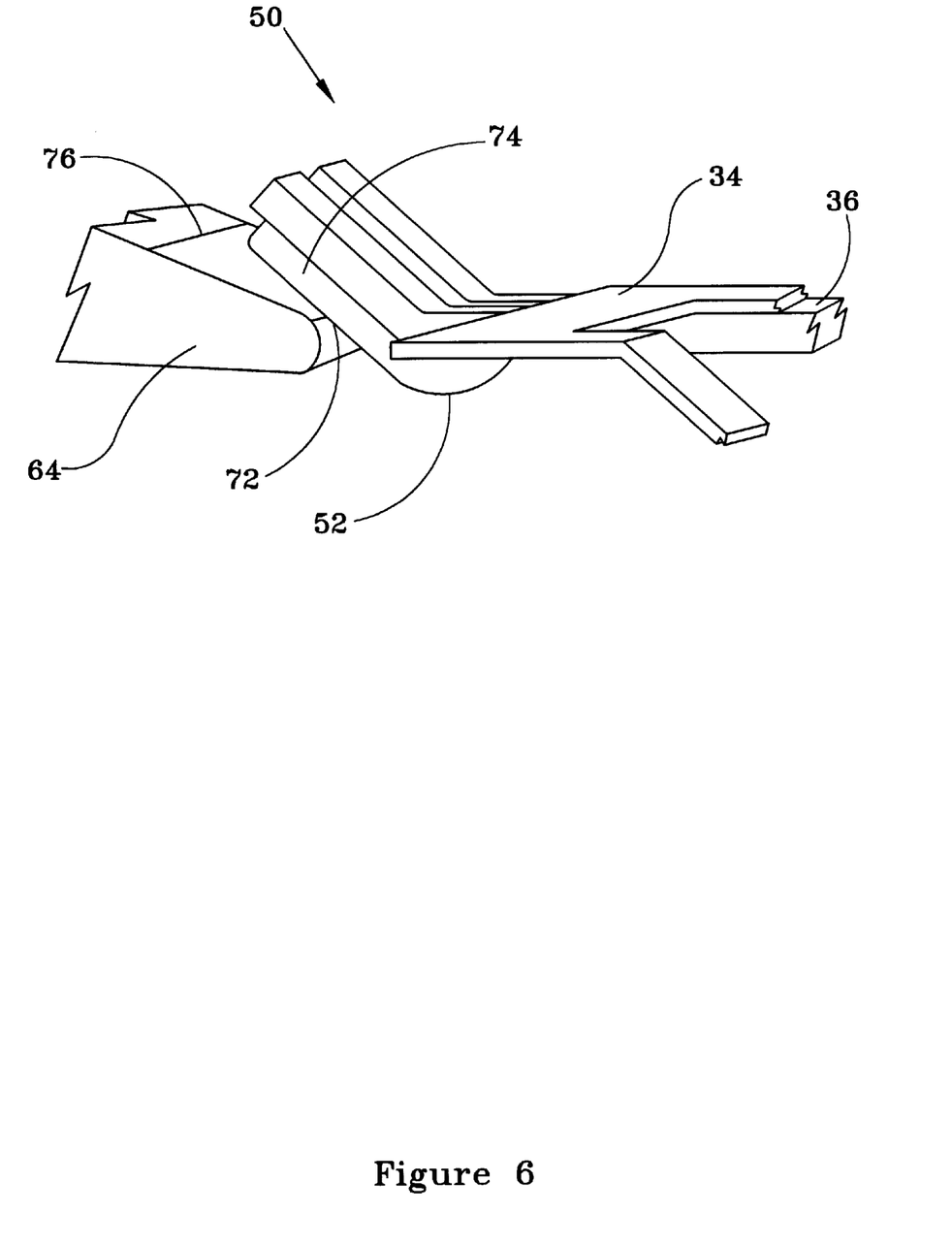
FIG. 6 is an extreme detail perspective view showing the relationship between the inventive head suspension and a ramp structure.

Other advantages and benefits of the invention can be seen in FIG. 6 which is an extreme close-up detail perspective view showing the operational relationship between the ramp contact feature 50 and the ramp structure 64. Also shown are portions of the gimbal 34 and load beam 36.

As is apparent from the figure, when the ramp contact feature 50 contacts the ramp structure 64, contact is made only at a single point, designated in the figure by numerical reference 72. This is the result of the shape and angle of the inclined cylindrical portion 74, and the profile of the ramp structure 64. As is evident in the figure, the profile of the ramp structure 64 is flat, as shown by line 76 extending laterally across the width of the ramp structure 64. As the distal end of the ramp curves under, a lateral line is formed along which contact with the cylindrical portion 74 of the ramp contact feature 50 is made. The cylindrical portion 74 of the ramp contact feature 50 is inclined at angle which is greater than the angle of the ramp structure 64, and, since the lowermost portion of the cylindrical portion 74 is also a line, where the two lines meet single-point contact is made. The same single-point contact exists between the spherical end portion 52 and the ramp structure 64, since a sphere and a plane can only meet at a single point.

It will also be appreciated by one of skill in the art that it is much simpler to fabricate and maintain dimensional integrity with a ramp structure having a flat profile than would be possible with complex parabolic ramp profile shapes necessary to facilitate single-point contact with prior art ramp contact features.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A head suspension assembly for supporting a head assembly in cooperative engagement with a rotating disc, including a proximal mounting end and a distal end providing a mounting location for the head assembly, the head suspension assembly including a ramp contact feature extending laterally from a first lateral side of the head suspension assembly and in the form of a semi-cylindrical portion, inclined relative to a plane of disc rotation, and a spherical end portion at a proximal end of the semi-cylindrical portion.

2. A head suspension assembly as claimed in claim 1 wherein the ramp contact feature extends laterally from the head suspension assembly at a location near the mounting location for the head assembly and between the mounting location for the head assembly and the proximal mounting end of the head suspension assembly.

3. A head suspension assembly as claimed in claim 1, wherein the head suspension assembly further includes a secondary contact feature extending laterally from a second, laterally opposite side of the head suspension assembly from the ramp contact feature.

4. A disc drive including one or more discs mounted for rotation on a spindle motor, an array of one or more vertically aligned head assemblies each supported by a head suspension assembly for cooperative operation with the discs and a plurality of ramp structures, having flat ramp profiles and ramp contact surfaces inclined at a first angle relative to a plane of rotation of the discs, fixedly located near the outer diameters of the discs, the head suspension assembly including a ramp contact feature extending laterally from a first lateral side of the head suspension assembly and in the form of a semi-cylindrical portion, inclined relative to the plane of rotation of the discs at a second angle greater than the first angle, and a spherical end portion at a proximal end of the semi-cylindrical portion, the semi-cylindrical portion and spherical end portion providing single-point contact with the ramp structures.

5. A disc drive as claimed in claim 4 wherein the head suspension assembly includes a proximal mounting end and a distal end providing a head mounting location, and wherein the ramp contact feature extends laterally from the head suspension assembly at a location near the head mounting location and between the head mounting location and the proximal mounting end of the head suspension assembly.

6. A disc drive as claimed in claim 5 wherein the head suspension assembly includes a secondary contact feature extending laterally from a second laterally opposite side of the head suspension assembly from the ramp contact feature.

* * * * *